United States Patent
Taylor

(10) Patent No.: US 6,189,563 B1
(45) Date of Patent: Feb. 20, 2001

(54) ELECTRONIC PRESSURE CONTROL PILOT OPERATED RELIEF VALVE

(76) Inventor: Julian S. Taylor, 8300 SW. 8th St., Oklahoma City, OK (US) 73128

( * ) Notice: Under 35 U.S.C. 154(b), the term of this patent shall be extended for 0 days.

(21) Appl. No.: 09/356,867

(22) Filed: Jul. 15, 1999

(51) Int. Cl.$^7$ ............................................. F16K 31/124
(52) U.S. Cl. ..................... 137/487.5; 137/557; 251/30.01
(58) Field of Search ............................. 137/487.5, 557; 251/30.01, 43

(56) References Cited

U.S. PATENT DOCUMENTS

| | | |
|---|---|---|
| 4,699,351 * 10/1987 | Wells | 251/30.01 |
| 5,806,553 * 9/1998 | Sidwell | 137/487.5 |

* cited by examiner

Primary Examiner—Gregory L. Huson
Assistant Examiner—Ramesh Krishnamurthy
(74) Attorney, Agent, or Firm—Robert K. Rhea

(57) ABSTRACT

A pilot operated pressure relief valve is formed by a valve body having an inlet and outlet port forming a passageway therebetween. A centrally bored valve is slideably supported by the body for movement toward and away from the valve inlet. The valve body is provided with an axial extension projecting opposite the inlet port forming a pressure chamber receiving upstream fluid pressure through the valve which is sensed by a sensor and normally transfers fluid pressure through a pilot operated, normally closed three-way two-position valve, to the end of the valve opposite the seat to maintain pressure differential across the valve equalized. Excess pressure above a predetermined value in the pressure chamber shifts the manifold valve to unseat the valve and discharge fluid downstream through the outlet port and apertures and passageway in the valve head.

6 Claims, 3 Drawing Sheets

ELECTRONIC PRESSURE CONTROL PILOT OPERATED RELIEF VALVE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to relief valves and more particularly to an electronic control pilot operated pressure relief valve.

1. Field of the Invention
2. Description of the Prior Art

Industrial pressure relief valves are well known and several types are presently in use. Some being actuated by a spring releasing the valve to open under a predetermined pressure while others feature a frangible disc which ruptures or a slender column which buckles to permit a valve to open and release pressure. Other types of relief valves use the system pressure, when under the required limit, to maintain a relief valve closed and features an external pilot connected with the upstream side of the valve by small tubing to release excess pressure above a predetermined limit by allowing the valve to open and the system to blow down.

It is desirable to provide a pressure relief valve which is provided with valve head passageways allowing system pressure below a set pressure to maintain the valve closed but which is triggered open by a sensor sensing the pressure above a predetermined limit which quickly releases dome system pressure against the closed valve piston and discharges this pressure through the valve body to a downstream low pressure disposal system as the system blows down through the opened valve.

SUMMARY OF THE INVENTION

A bored and counterbored valve body having an inlet port is provided with a valve seat adjacent its inlet port. A lateral body bore intersects the counterbore to form an outlet port. A valve head closes the body bore opposite the inlet port and includes a skirt slidably receiving a piston having a valve closing the inlet port by seating on the valve seat. The piston valve features a rod-like axial stem centrally bored through the piston which slidably enters an axial blind sleeve forming a pressure chamber on the upper end on the valve head.

Fluid entering the valve body through its inlet port passes through the piston valve and pressure chamber and enters a manifold containing a normally closed two-position three-way pilot operated valve in fluid communication with the body bores and ports in the valve head. An electronic pressure sensor communicating with the pressure chamber energizes the solenoid pilot in response to fluid pressure above a predetermined value, of the three-way two position valve to open the latter to discharge fluid pressure in the valve head downstream through the outlet port allowing upstream fluid pressure to unseat the piston valve and open the body passageway to exhaust through the valve.

The principal object of this invention is to provide a fluid pressure relief valve normally closed by upstream fluid pressure against the downstream side of a piston valve which releases the valve closing fluid pressure to discharge downstream in response to upstream pressure against the piston valve above a predetermined limit.

DETAILED DESCRIPTION OF THE INVENTION

Figure 1:
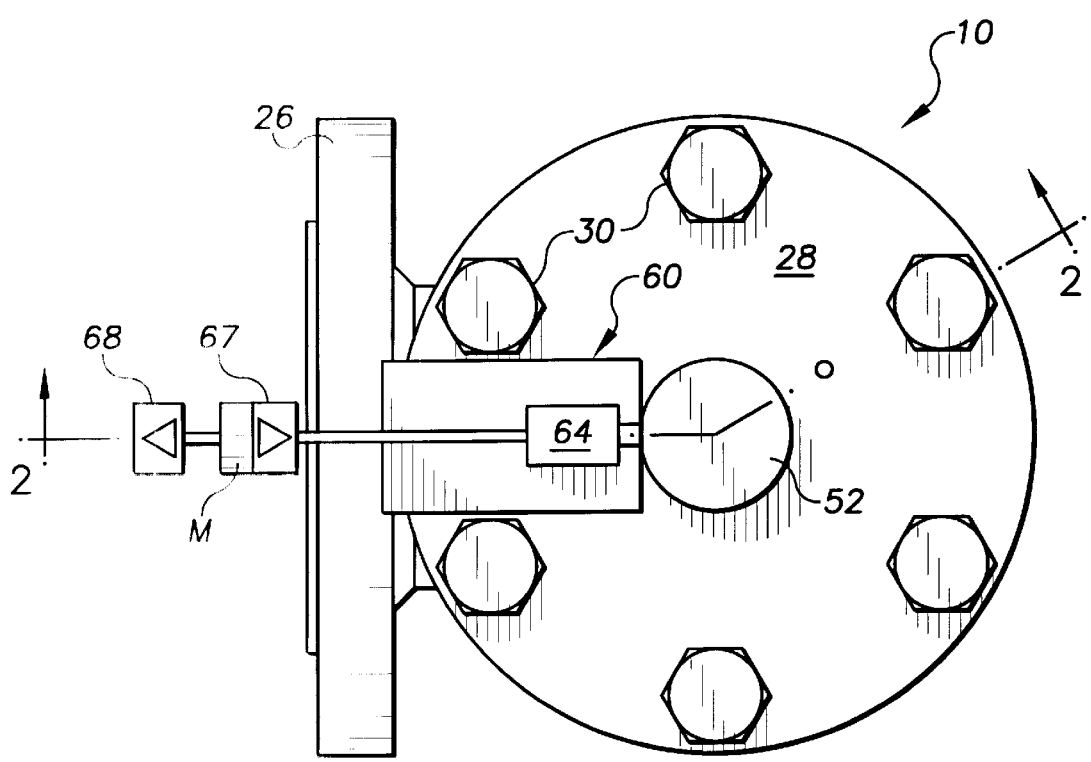
FIG. 1 is a top view.
Figure 2:
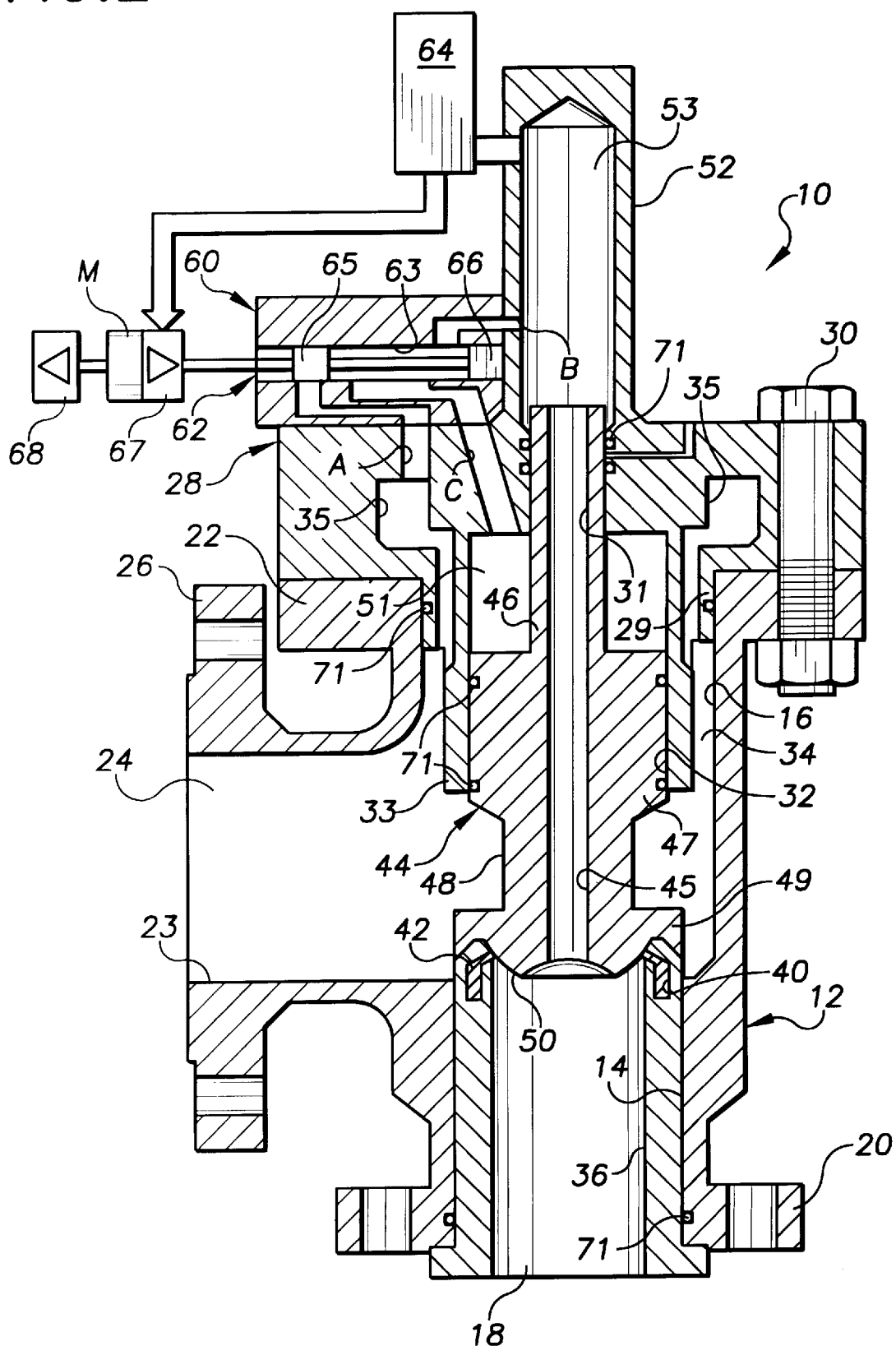
FIG. 2 is a vertical cross sectional view taken substantially along the line 2—2 of FIG. 1 in valve closed position; and, FIG. 3 is a similar vertical cross sectional view illustrating the valve in open pressure released position.

Like characters of reference designate like parts in those figures of the drawings in which they occur.

Figure 3:
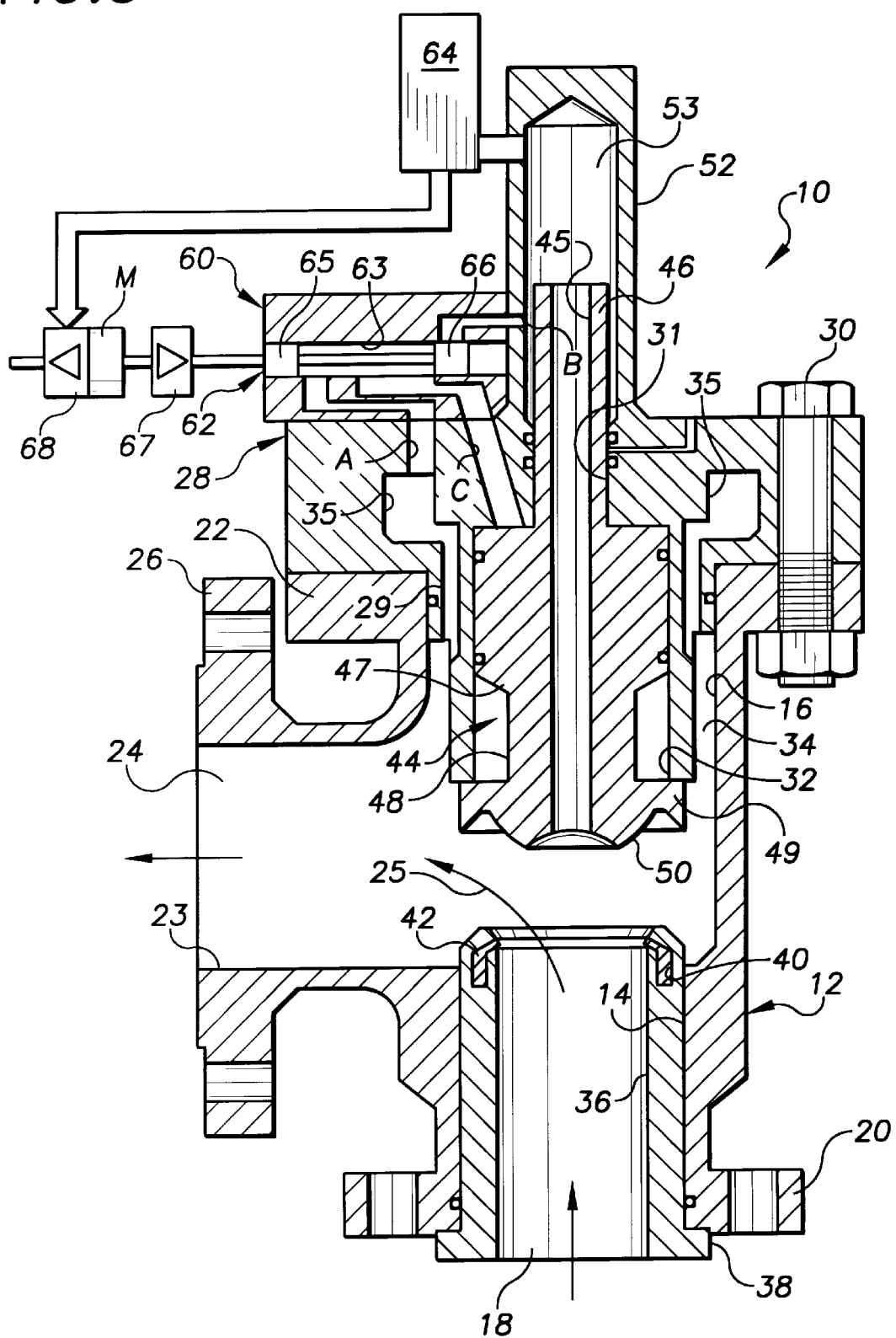

In the drawings:

The reference numeral 10 indicates the relief valve as a whole having a body 12 bored and counterbored as at 14 and 16 to form an inlet port 18. The inlet port is provided with an annular outstanding bolt flange 20 for connection with a pipe or vessel, neither being shown. Similarly, the counterbore 16 is provided with an outstanding bolt flange 22 for the reason presently apparent. The valve body is laterally bored as at 23 to form an outlet 24 defining a passageway 25 (FIG. 3) between the inlet and outlet ports when the valve is biased open. The outlet port is similarly provided with an outstanding bolt flange 26.

The valve counterbore 16 opposite the inlet port is closed by a valve head 28 having a stem 29 sealing with the inner periphery of the counterbore 16 opposite the inlet port. The depending end portion of the valve head stem 29 is circumferentially reduced, and the valve head is bored and counterbored as at 31 and 32 forming a skirt 33 with its perimeter defining an annulus 34 between the skirt and the counterbore 16 for the purposes presently explained.

The valve head is further provided with an annular recess 35 between the inner and outer peripheries of the valve head open upwardly through a port A for the purposes presently explained. A second valve head port C communicates with the upper limit of the valve head bore 32.

A sleeve 36, having a depending flanged end 38, is axially received by the inlet bore 14 and is provided at its upper end, projecting into the passageway 25, with an annular recess 40 containing a resilient valve seat 42. A piston valve 44, having a coextensive axial bore 45 including an upstanding axial stem portion 46 is slidably received by the valve head bore 31. The wall of the piston valve head 47 is slidably received by the sleeve counterbore 32.

The piston valve 44 is diametrically reduced as at 48 adjacent its depending end to define a flange-like end portion 49 having its depending surface cooperatively overlying the upper end of the sleeve 36 forming a valve chamber 51, above the piston valve head 47. The piston valve has a depending part spherical surface 50 forming a bubble tight seal with the valve seal 42, when in closed position, such as is disclosed by the Taylor U.S. Pat. No. 4,446,886.

The valve head 28 is further provided with a blind cylinder 52 having its wall, at its open end, integrally connected axially with the valve head forming a pressure chamber 53 for loosely receiving the piston valve stem 46 when the valve is unseated and communicating with the upstream pressure, as is presently explained. The wall of the cylinder 52 is also provided with an outlet port B for the purposes which will now be explained.

A manifold 60 containing a three-way two position control valve 62, having a magnetically attracted material cylinder M attached to its stem, is mounted on the valve head 28 adjacent the blind cylinder 52. The manifold is provided with a plurality (3) passageways respectively communicating, at their innermost ends, with the control valve chamber 63, and communicating at their outward end with the valve head ports A and C and B, respectively.

An electronic pressure controller 64 communicates with the pressure chamber 53 for monitoring fluid pressure in the valve 10. When the pressure is below set point, the pressure controller 64 energizes the manifold valve pilot 67 to attract the valve cylinder M and shift the control valve pistons 65 and 66 to a valve closed position in which the piston 65 closes the valve head port A allowing upstream fluid pressure through the valve stem 46 and in the pressure chamber 53 to pass from the pressure chamber port B through the control valve chamber 63 and the valve head port C to the valve head chamber 51. This puts upstream pressure on a larger piston area than the valve surface 50 that results in an axial force on valve 44 to maintain the valve 10 in closed position. When the upstream fluid pressure reaches a point above the set point, the pressure controller 64 energizes the control valve solenoid 68 to attract the valve cylinder M and shift the control valve 62 (FIG. 3), and close the manifold inlet from the pressure chamber port B and allow fluid pressure in the valve head chamber 51 to exhaust through the valve head port C in a downstream direction through the valve head port A and the annulus 34. Opening the valve 44 allows excess pressure to move through the passageway 25 in a downstream direction.

When the upstream pressure has been relieved, and the pressure within the pressure chamber 53 reaches a point below the set point, the pressure controller 64 energizes the manifold valve solenoid 66 to close the control valve moving its pistons to the position previously described for a normal operating position of the valve which reseats the valve 44 on the seat 42. The several O-rings 71 seal mating parts fluid tight.

Obviously the invention is susceptible to changes or alterations without defeating its practicability. Therefore, I do not wish to be confined to the preferred embodiment(s) shown in the drawing(s) and described herein.

I claim:

1. A fluid pressure relief valve, comprising:

a valve body having bores forming inlet and outlet ports;

a valve seat in the inlet port;

an axially bored valve head on the body opposite the valve seat said valve head having a skirt projecting toward said valve seat;

an axially bored piston valve slidably supported by the valve head for movement toward and away from the valve seat, said valve head having axially offset first and second fluid passageways respectively communicating with the outlet port and downstream limit of the valve head;

a blind cylinder on said valve head having a wall forming a pressure chamber axially opposite the valve seat and having a third fluid passageway through the cylinder wall;

a manifold having a valve chamber on the valve head providing fluid communication between the first, second and third fluid passages through the valve chamber;

a pilot operated three-way two position control valve in the manifold valve chamber; and, fluid pressure sensing means responsive to the fluid pressure in the blind cylinder pressure chamber for normally maintaining the pressure differential across said piston valve equalized and shifting said control valve to exhaust fluid pressure downstream from the downstream limit of said piston valve in response to fluid pressure above a predetermined value.

2. The relief valve according to claim 1 and further including:

a piston valve rod opposite the valve seat and axially slideable in the valve head bore.

3. The relief valve according to claim 2 and further including:

said valve head having a downwardly open annulus, adjacent the outer periphery of said skirt, communicating with the said first valve head fluid passageway.

4. A fluid pressure relief valve, comprising:

a valve body having bores forming inlet and outlet ports and a fluid passageway therebetween;

a valve seat in the inlet port;

an axially bored valve head on the body opposite the valve seat, said valve head having a skirt projecting toward the valve seat, an axially bored piston valve slidably supported by the valve head skirt for movement toward and away from the valve seat, said valve head having axially offset first and second fluid passages respectively communicating with the outlet port and downstream limit of the valve head;

a blind cylinder on said valve head having a wall forming a pressure chamber axially opposite the valve seat and having a third fluid passageway through the cylinder wall;

a manifold having a valve chamber on the valve head providing fluid communication between the first, second and third fluid passageways through the valve chamber;

a pilot operated three-way two position control valve in the manifold valve chamber; and, fluid pressure sensing means responsive to the fluid pressure in the blind cylinder pressure chamber for normally maintaining the pressure differential across said piston valve equalized and shifting said control [manifold] valve to exhaust fluid pressure downstream from the downstream limit of said piston valve in response to fluid pressure above a predetermined value.

5. The relief valve according to claim 4 and further including:

a valve rod opposite the valve seat axially slideable in the valve head bore.

6. The relief valve according to claim 5 and further including:

said valve head having a downwardly open annulus communicating with the said first valve head fluid passageway.

* * * * *